(12) United States Patent
Inoue et al.

(10) Patent No.: US 11,008,041 B2
(45) Date of Patent: May 18, 2021

(54) FUEL CELL VEHICLE

(71) Applicant: TOYOTA JIDOSHA KABUSHIKI KAISHA, Toyota (JP)

(72) Inventors: Mikio Inoue, Nagoya (JP); Kohei Shigematsu, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 219 days.

(21) Appl. No.: 16/284,363

(22) Filed: Feb. 25, 2019

(65) Prior Publication Data

US 2019/0263450 A1    Aug. 29, 2019

(30) Foreign Application Priority Data

Feb. 28, 2018    (JP) .............................. JP2018-034156

(51) Int. Cl.
```
B62D 21/15      (2006.01)
B60K 1/04       (2019.01)
B62D 21/18      (2006.01)
B60K 15/03      (2006.01)
```
(52) U.S. Cl.
CPC .............. B62D 21/152 (2013.01); B60K 1/04 (2013.01); B62D 21/157 (2013.01); B62D 21/18 (2013.01); *B60K 2015/03118* (2013.01); *B60K 2015/03315* (2013.01)

(58) Field of Classification Search
CPC .... B62D 21/152; B62D 21/157; B62D 21/18; B60K 1/04; B60K 2015/03315

USPC ................. 296/187.09, 204, 187.03, 193.07
See application file for complete search history.

(56) References Cited

U.S. PATENT DOCUMENTS

| | | | | |
|---|---|---|---|---|
| 5,392,873 A | * | 2/1995 | Masuyama | B60L 50/66 180/68.5 |
| 8,056,928 B2 | * | 11/2011 | Ijaz | B60K 15/07 280/830 |
| 2006/0027406 A1 | * | 2/2006 | Borroni-Bird | H01M 8/04208 280/831 |
| 2020/0148075 A1 | * | 5/2020 | Op De Beeck | H01M 8/04925 |

FOREIGN PATENT DOCUMENTS

JP        2007-186200        7/2007

* cited by examiner

*Primary Examiner* — D Glenn Dayoan
*Assistant Examiner* — E Turner Hicks
(74) *Attorney, Agent, or Firm* — Oblon, McClelland, Maier & Neustadt, L.L.P.

(57) ABSTRACT

A vehicle includes a vehicle body having a frame structure provided with a pair of right and left side rails, and hydrogen tanks and a secondary battery disposed in a region between the side rails. The side rails have deformed portions that are deformed due to a vehicle front collision load at the time of a vehicle front collision, and the hydrogen tanks are disposed in front of the secondary battery or on both outer sides of the secondary battery in a vehicle width direction such that the deformed portions, when the amount of movement of each of the deformed portions of the side rails has reached a predetermined amount, reach the hydrogen tanks without reaching the secondary battery.

13 Claims, 7 Drawing Sheets

FUEL CELL VEHICLE

INCORPORATION BY REFERENCE

The disclosure of Japanese Patent Application No. 2018-034156 filed on Feb. 28, 2018 including the specification, drawings and abstract is incorporated herein by reference in its entirety.

BACKGROUND

1. Technical Field

The present disclosure relates to a fuel cell vehicle. In particular, the disclosure relates to improvement in mounting forms of a hydrogen tank and a secondary battery.

2. Description of Related Art

In the related art, as disclosed in Japanese Unexamined Patent Application Publication No. 2007-186200 (JP 2007-186200 A), a vehicle is provided with a motor that is a drive force source for the vehicle, a hydrogen tank that stores hydrogen, a fuel cell stack that generates electric power and supplies the electric power to the motor or the like, and a secondary battery that stores electric power or supplies the electric power to the motor.

In the fuel cell vehicle disclosed in JP 2007-186200 A, a fuel cell stack is disposed below a front seat, a secondary battery is disposed below a rear seat, and a hydrogen tank is disposed at a rear lower portion of the rear seat. JP 2007-186200 A also discloses a frame structure being adopted as a vehicle body of the fuel cell vehicle.

SUMMARY

Generally, in a vehicle provided with a vehicle body having a frame structure, in many cases, a drive force source for a vehicle is disposed at a front portion of the vehicle body and the vehicle is driven by rear wheels. For this reason, a propeller shaft extending along a front-rear direction of the vehicle body is disposed between the traveling drive force source and a differential device disposed between the rear wheels (driving wheels).

The inventors have considered a mounting form of each of the units such as a motor, a hydrogen tank, a fuel cell stack, and a secondary battery in designing a vehicle provided with a vehicle body having a frame structure.

The inventors have focused on removing a propeller shaft in order to secure spaces for disposing the units between side rails of a vehicle body frame. That is, the inventors have considered that rear-wheel drive is realized without requiring the propeller shaft by disposing the motor at the rear portion of the vehicle body, and the hydrogen tank and the secondary battery are disposed in the region between a pair of right and left side rails.

As the mounting form of each of the hydrogen tank, the fuel cell stack, and the secondary battery in a general fuel cell vehicle, as disclosed in JP 2007-186200 A, the fuel cell stack, the secondary battery, and the hydrogen tank are disposed in this order from the front side of the vehicle body. That is, the secondary battery is disposed in front of the hydrogen tank.

FIG. 7 is a plan view schematically showing a vehicle body frame a in a case of adopting such a mounting form as described as above, and a configuration in which a fuel cell stack b, a secondary battery c, a hydrogen tank d, and a transaxle e (transaxle e accommodating a traveling motor f) are disposed in this order from the front side of a vehicle body on the vehicle body frame a.

However, in such a mounting form of each of the units b, c, d, e, at the time of a front collision of a vehicle (hereinafter simply referred to as a "vehicle front collision"), the side rails g that are deformed due to a front collision load or the fuel cell stack b moving rearward due to the front collision load interferes with the secondary battery c, and thus there is a possibility that the secondary battery c may be damaged. An imaginary line in FIG. 7 shows a state where the side rails g interfere with the secondary battery c in a case where the side rails g are deformed due to the front collision load. Since the secondary battery c is a high-voltage part, protection is particularly needed. However, in the configuration shown in FIG. 7, there is a possibility that the secondary battery c may not be sufficiently protected.

The disclosure provides a configuration in which it is possible to sufficiently protect a secondary battery in a fuel cell vehicle provided with a vehicle body having a frame structure.

A first aspect of the disclosure relates to a vehicle including a vehicle body having a frame structure provided with a pair of right and left side rails, and hydrogen tanks and a secondary battery disposed in a region between the side rails. The side rails have deformed portions that are deformed due to a vehicle front collision load at the time of a vehicle front collision, and the hydrogen tanks are disposed in front of the secondary battery or on both outer sides of the secondary battery in a vehicle width direction such that the deformed portions, when the amount of movement of each of the deformed portions of the side rails has reached a predetermined amount, reach the hydrogen tanks without reaching the secondary battery.

According to the first aspect, at the time of the vehicle front collision, in a case where the deformed portions of the side rails, which are deformed due to the vehicle front collision load, move, the amount of movement of each of the deformed portions has reached a predetermined amount so that the deformed portions reach the hydrogen tanks without reaching the secondary battery. In general, the rigidity of the hydrogen tank is higher than that of the secondary battery. That is, the vehicle front collision load is input to the hydrogen tank having higher rigidity than the secondary battery. For this reason, it is possible to restrain the vehicle front collision load from being input to the secondary battery, and thus it is possible to sufficiently protect the secondary battery that is a high-voltage part.

In the vehicle according to the first aspect, the deformed portion of each of the side rails may be a first kick portion that is curved outward in the vehicle width direction toward the rear side of the vehicle body in front of the hydrogen tanks.

According to the aspect, in a case where the vehicle front collision load is input to a vehicle body frame provided with the side rail having such a kick portion, the kick portion is buckled and deformed by receiving the vehicle front collision load and also moves inward in the vehicle width direction while moving toward the rear side of the vehicle body. In a case where such a movement of the kick portion occurs, when the secondary battery is disposed in front of the hydrogen tank (refer to the configuration described using FIG. 7), there is a possibility that the kick portion may interfere with the secondary battery. According to the aspect, the hydrogen tanks are disposed in front of the secondary battery or on both outer sides of the secondary battery in the vehicle width direction, and therefore, the kick portion that moves as described above reaches the hydrogen tank without reaching the secondary battery, and therefore, it is possible to restrain the vehicle front collision load from being input to the secondary battery, and thus it is possible to sufficiently protect the secondary battery that is a high-voltage part.

In the vehicle according to the first aspect, front ends of the hydrogen tanks may be disposed rearward of the first kick portion in a vehicle front-rear direction.

A second aspect of the disclosure relates to a vehicle including: a vehicle body having a frame structure provided with a pair of right and left side rails, a hydrogen tank and a secondary battery disposed in a region between the side rails, and a moving member that moves toward the rear side of the vehicle body due to a vehicle front collision load at the time of a vehicle front collision. The hydrogen tank is disposed in front of the secondary battery such that the moving member, when the amount of movement of the moving member has reached a predetermined amount, reaches the hydrogen tank without reaching the secondary battery.

According to the second aspect, the moving member, when the amount of movement of the moving member that moves toward the rear side of the vehicle body due to the vehicle front collision load at the time of the vehicle front collision has reached a predetermined amount, reaches the hydrogen tanks without reaching the secondary battery. That is, the vehicle front collision load is input to the hydrogen tanks having higher rigidity than the secondary battery. For this reason, also in this case, it is possible to restrain the vehicle front collision load from being input to the secondary battery, and thus it is possible to sufficiently protect the secondary battery that is a high-voltage part.

In the vehicle according to the second aspect, the moving member may be a fuel cell stack disposed in front of the hydrogen tank in a vehicle front-rear direction.

According to the aspect, at the time of the vehicle front collision, there is a case where the fuel cell stack moves toward the rear side of the vehicle body due to the vehicle front collision load. In a case where such a movement of the fuel cell stack occurs, when the secondary battery is disposed in front of the hydrogen tank (when the secondary battery is disposed behind the fuel cell stack, as described using FIG. 7), there is a possibility that the moving fuel cell stack may interfere with the secondary battery. In this solution means, since the hydrogen tank is disposed in front of the secondary battery, the fuel cell stack that moves as described above reaches the hydrogen tank without reaching the secondary battery, and therefore, it is possible to restrain the vehicle front collision load from being input to the secondary battery, and thus it is possible to sufficiently protect the secondary battery that is a high-voltage part.

In the vehicle according to the first aspect and the second aspect, a transaxle having a running motor may be disposed between a pair of right and left rear wheels as driving wheels, a drive shaft extending along the vehicle width direction from the transaxle may be connected to each of the rear wheels, and the secondary battery may be disposed in front of the transaxle in the vehicle front-rear direction.

According to the aspect, the secondary battery having relatively large weight can be disposed at a position close to the center in the front-rear direction of the vehicle body, and thus equalization of the weight balance in the front-rear direction of the vehicle (equalization of the weight distribution in the front and rear of the vehicle body) can be achieved, thereby making it possible to contribute to improvement in steering stability of the vehicle.

The vehicle according to the first aspect and the second aspect may further include hydrogen tanks disposed on a side of the secondary battery, the side being outside of the side rails in the vehicle width direction.

According to the aspect, since the hydrogen tanks which are higher in rigidity than the secondary battery are disposed on a side of the secondary battery, the side being outside of the side rails in the vehicle width direction, a vehicle side collision load at the time of a side collision of the vehicle (hereinafter simply referred to as a "vehicle side collision") is input to the hydrogen tank and the side rail, and thus it is possible to restrain the vehicle side collision load from being input to the secondary battery. For this reason, it is also possible to sufficiently protect the secondary battery, which is a high-voltage part, against the vehicle side collision load.

In the vehicle according to the first aspect and the second aspect, the hydrogen tanks may be disposed between the side rails in the vehicle width direction.

A third aspect of the disclosure relates to a vehicle including a vehicle body having a frame structure provided with a pair of right and left side rails, and hydrogen tanks and a secondary battery disposed in a region between the side rails. The side rails have deformed portions that are deformed due to a vehicle front collision load at the time of a vehicle front collision, and the hydrogen tanks are disposed in front of the secondary battery or on both outer sides of the secondary battery in a vehicle width direction such that a distance between the deformed portion of each of the side rails and the secondary battery is shorter than a distance between the deformed portion of each of side rails and each of the hydrogen tanks.

A fourth aspect of the disclosure relates to a vehicle including a vehicle body having a frame structure provided with a pair of right and left side rails, and hydrogen tanks and a secondary battery disposed in a region between the side rails. The side rails have deformed portions that are deformed due to a vehicle front collision load at the time of a vehicle front collision, and the secondary battery is disposed further away from the deformed portions than the hydrogen tanks in a displacement direction of the deformed portion of each of the side rails.

In the vehicle according to the fourth aspect, the displacement direction of the deformed portion of each of the side rails may be a vehicle front-rear direction.

A fifth aspect of the disclosure relates to a vehicle including a vehicle body having a frame structure provided with a pair of right and left side rails, hydrogen tanks and a secondary battery disposed in a region between the side rails, and a moving member that moves toward the rear side of the vehicle body due to a vehicle front collision load at the time of a vehicle front collision. The secondary battery is disposed further away from the moving member than the hydrogen tank in a moving direction of the moving member.

According to each aspect of the disclosure, the hydrogen tanks and the secondary battery are disposed in the region between the side rails, and at the time of the vehicle front collision, the deformed portion of the side rail, which is deformed due to the vehicle front collision load at the time of the vehicle front collision, or the moving member that moves toward the rear side of the vehicle body due to the vehicle front collision load reaches the hydrogen tank without reaching the secondary battery. For this reason, the vehicle front collision load is input to the hydrogen tank having higher rigidity than the secondary battery, and therefore, it is possible to restrain the vehicle front collision load from being input to the secondary battery, and thus it is possible to sufficiently protect the secondary battery that is a high-voltage part.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments will be described based on the drawings.

First Embodiment

First, a first embodiment will be described. In this embodiment, a fuel cell vehicle provided with a vehicle body frame having a kick portion at a side rail will be described.

Figure 1:
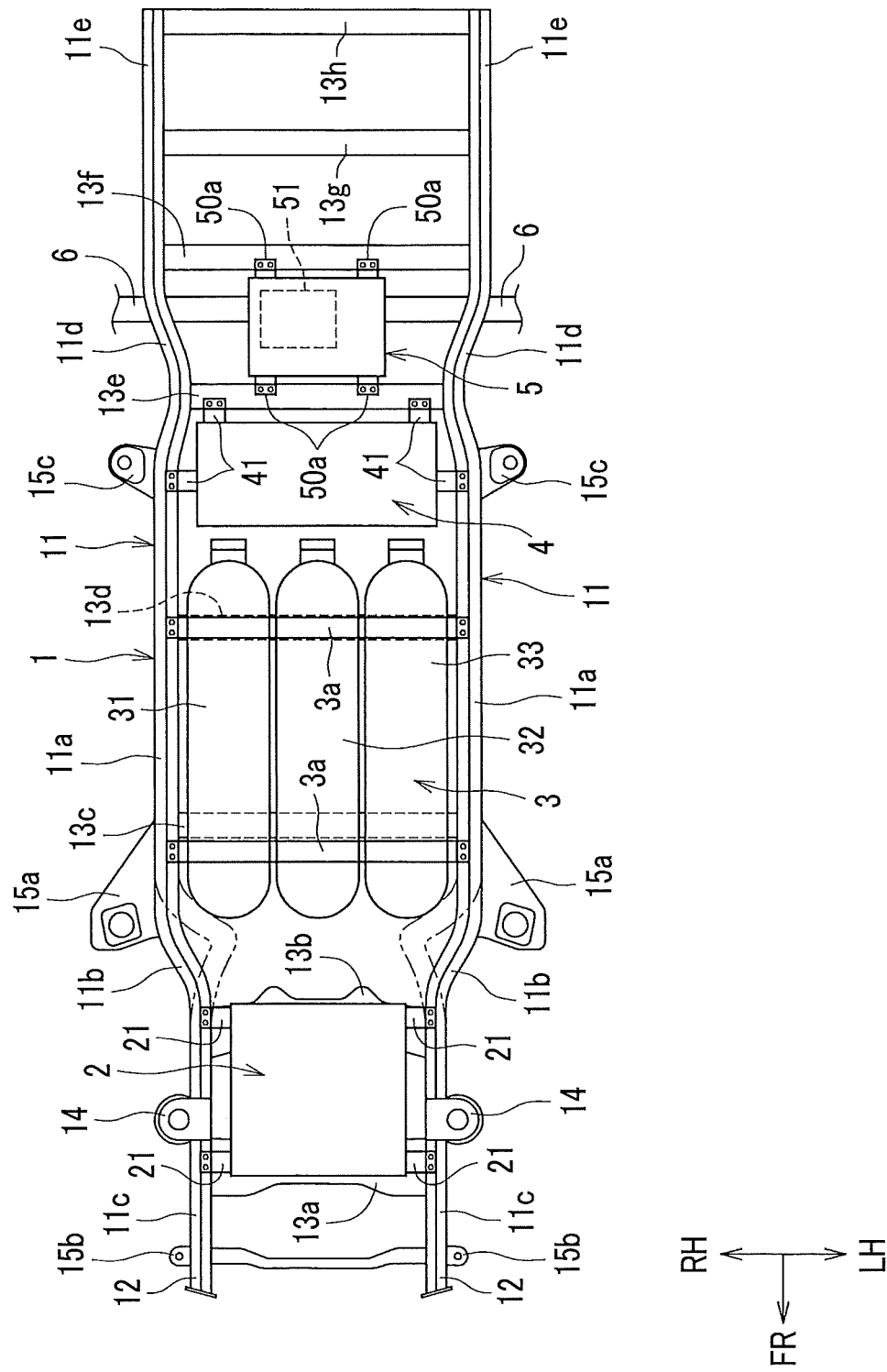
FIG. 1 is a plan view schematically showing a vehicle body frame according to a first embodiment and a mounting form of each of a fuel cell stack, a hydrogen tank, a secondary battery, and a transaxle disposed on the vehicle body frame.
Figure 2:
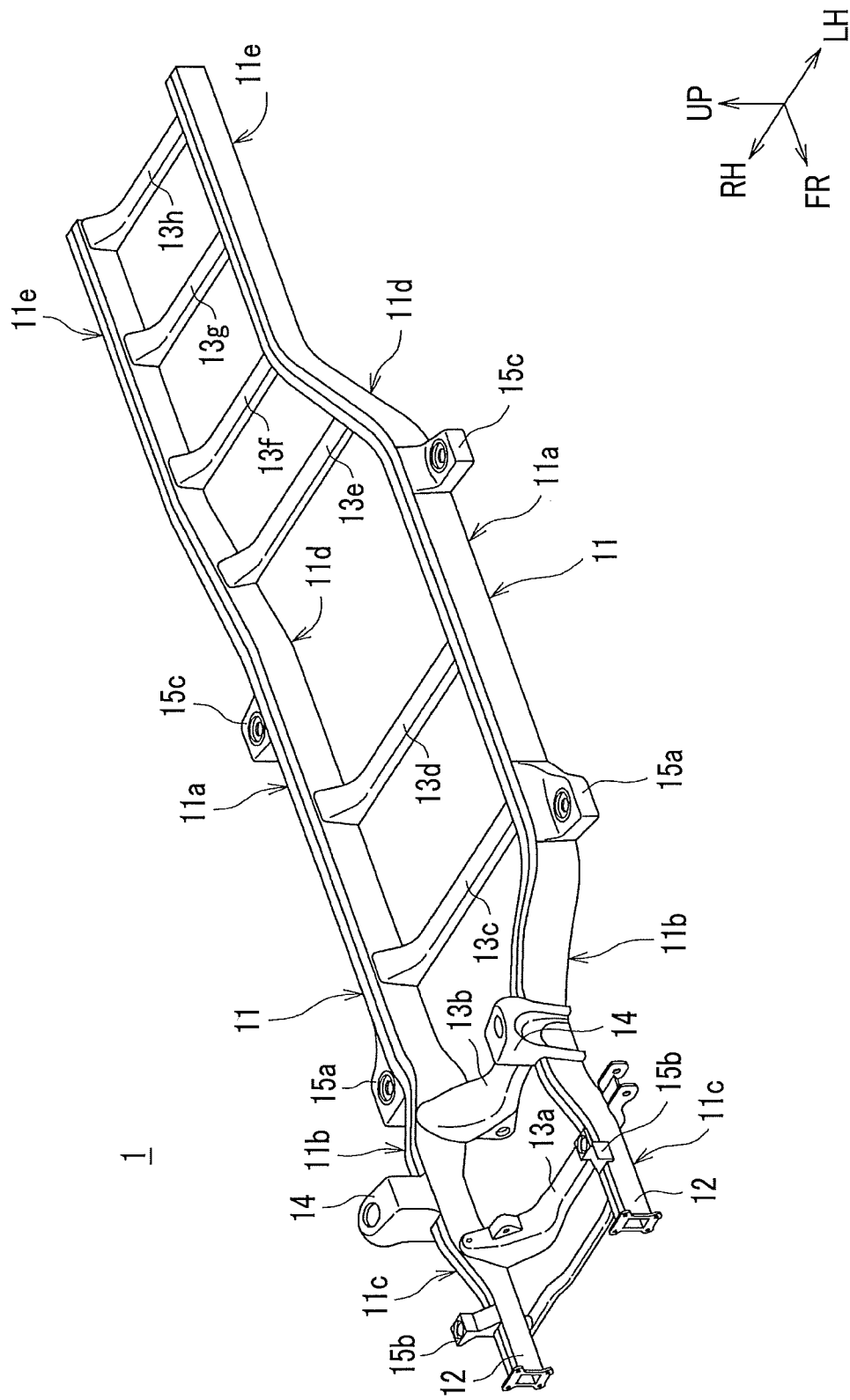
FIG. 2 is a perspective view showing the vehicle body frame.

FIG. 1 is a plan view schematically showing a vehicle body frame 1 according to this embodiment and a mounting form of each of a fuel cell stack (a fuel cell) 2, a hydrogen tank 3, a secondary battery 4, and a transaxle 5 disposed on the vehicle body frame 1. FIG. 2 is a perspective view showing the vehicle body frame 1. An arrow FR in these drawings indicate a front direction of a vehicle body, an arrow UP indicates an upward direction, an arrow RH indicates a right direction of the vehicle body, and an arrow LH indicates a left direction of the vehicle body.

As shown in these drawings, the fuel cell vehicle is a rear-wheel drive type vehicle, and each of units such as the fuel cell stack 2, the hydrogen tank 3, the secondary battery 4, and the transaxle 5 is mounted on the vehicle body frame 1. The vehicle body frame 1 will be described before description of a mounting form and function of each of the units 2, 3, 4, 5.

Configuration of Vehicle Body Frame

The vehicle body frame 1 is configured as a so-called ladder frame and has a pair of right and left side rails 11 extending along a front-rear direction of the vehicle body on both outer sides in a vehicle width direction. The side rails 11 are provided with intermediate portions 11a, front-side kick portions 11b, front portions 11c, rear-side kick portions 11d, and rear portions 11e that are continuous along the front-rear direction of the vehicle body.

The intermediate portions 11a extend in a horizontal direction along the front-rear direction of the vehicle body in a predetermined range between disposition positions of front wheels (not shown) and disposition positions of rear wheels (not shown). Each of the front-side kick portions 11b is continuous with a front end of each of the intermediate portions 11a and has a shape that is curved upward toward the front side of the vehicle body. Each of the front portions 11c is continuous with a front end of each of the front-side kick portions 11b and extends toward the front side of the vehicle body. The front wheels are disposed outside the front portions 11c in the vehicle width direction. For this reason, the dimension in the vehicle width direction between the front portions 11c of the side rails 11 (the dimension between the right and left side rails 11) is set to be shorter than the dimension in the vehicle width direction between the intermediate portions 11a in consideration of interference with the front wheels. For this reason, each of the front-side kick portions 11b has a shape that is curved to the outside in the vehicle width direction toward the rear side of the vehicle body (an example of the kick portion).

Each of the rear-side kick portions 11d is continuous with a rear end of each of the intermediate portions 11a and has a shape that is curved upward toward the rear side of the vehicle body. Each of the rear portions 11e is continuous with a rear end of each of the rear-side kick portions 11d and extends toward the rear side of the vehicle body. The rear wheels are disposed outside the rear portions 11e in the vehicle width direction. For this reason, the dimension in the vehicle width direction between the rear portions 11e of the side rails 11 (the dimension between the right and left side rails 11) is also set to be shorter than the dimension in the vehicle width direction between the intermediate portions 11a in consideration of interference with the rear wheels.

Crush boxes 12 for absorbing energy (collision load) at the time of a vehicle front collision are provided on the front side of the front portions 11c of the right and left side rails 11, respectively. A bumper reinforcement (not shown) extending along the vehicle width direction is spanned between front end portions of a pair of right and left crush boxes 12.

A plurality of cross members 13a to 13h extending along the vehicle width direction is spanned between the side rails 11.

Suspension mount brackets 14 made of metal and protruding outward in the vehicle width direction are disposed between the cross member 13a and the cross member 13b at the front portions 11c of the side rails 11.

Cab mount brackets 15a, 15b, 15c are respectively disposed at the rear end portions of the front-side kick portions 11b of the side rails 11, the front end portions of the front portions 11c of the side rails 11, and the front end portions of the rear-side kick portions 11d of the side rails 11. The cab mount brackets 15a, 15b, 15c protrude outward in the vehicle width direction, and cab mounts (not shown) are mounted thereto. Then, a configuration is made such that a cabin (not shown) can be connected to the side rails 11 through the cab mounts and the cab mount brackets 15a, 15b, 15c.

Mounting Form of Each Unit

Next, the mounting form and function of each of the units such as the fuel cell stack 2, the hydrogen tank 3, the secondary battery 4, and the transaxle 5 mounted on the vehicle body frame 1 will be described.

As the mounting forms of these units, as shown in FIG. 1, the fuel cell stack 2, the hydrogen tank 3, the secondary battery 4, and the transaxle 5 are disposed in this order from the front side of the vehicle body in the region between the side rails 11.

The fuel cell stack 2 is disposed in the region between the front portions 11c of the side rails 11 of the vehicle body frame 1. More specifically, the fuel cell stack 2 is accommodated in an accommodation compartment on the front side of the vehicle, which is partitioned from a vehicle cabin by a dash panel (not shown).

The fuel cell stack 2 is provided with a plurality of brackets 21 extending in the horizontal direction toward the outside in the vehicle width direction, and the brackets 21 are superposed on and bolted to the front portions 11c of the side rails 11.

The support structures for the fuel cell stack 2 are not limited thereto and may be configured to be bolted to the cross members 13a, 13b.

The fuel cell stack 2 is a power generation device that generates electric energy by utilizing a chemical reaction between hydrogen that is supplied from the hydrogen tank 3 and oxygen in air, is provided with an electrode composite body in which a hydrogen electrode catalyst and an oxygen electrode catalyst are respectively coated on both surfaces of a solid polymer electrolyte membrane, and is configured by stacking a plurality of cells, in each of which the electrode composite body is sandwiched between separators.

The fuel cell stack 2 is electrically connected to a traveling motor 51 provided in the transaxle 5 through a DC/DC converter (not shown) and an inverter (not shown). In this way, after the voltage from the fuel cell stack 2 is boosted by the DC/DC converter, the direct current from the DC/DC converter is converted into an alternating current by the inverter, and the alternating current is supplied to the traveling motor 51.

The hydrogen tank 3 is disposed in the region between the intermediate portions 11a of the side rails 11 behind the fuel cell stack 2. That is, a front end of the hydrogen tank 3 is located further on the slightly rearward in the front-rear direction of the vehicle body than each of the front-side kick portions 11b of the side rails 11.

The hydrogen tank 3 includes three hydrogen tanks 31, 32, 33, which are each longitudinally placed (disposed such that the longitudinal direction thereof is along the front-rear direction of the vehicle body) and are arranged in the vehicle width direction. The outer diameter dimension of each of the hydrogen tanks 31, 32, 33 (a dimension in the vehicle width direction in a state of being arranged) is set to be approximately ⅓ of the dimension between the intermediate portions 11a of the side rails 11 (in this specification, "approximately ⅓" is a meaning including "about ⅓"). For this reason, in a state where the hydrogen tanks 31, 32, 33 are arranged in the vehicle width direction, the hydrogen tanks 31, 32, 33 are disposed over the entire region in the vehicle width direction between the intermediate portions 11a.

The hydrogen tanks 31, 32, 33 are placed in a state of being spanned between a pair of cross members 13c, 13d and are mounted to each of the side rails 11 by bands 3a. The mounting structure of the hydrogen tanks 31, 32, 33 using the bands 3a is well known, and a configuration is made in which both ends of the bands 3a wound around the outer peripheries of the hydrogen tanks 31, 32, 33 are fastened to each of the side rails 11. A configuration is also acceptable in which both ends of the bands 3a are fastened to each of the cross members 13c, 13d.

The hydrogen tanks 31, 32, 33 are connected to each other by a pipe (not shown) and configured to supply hydrogen charged in the interior thereof to the fuel cell stack 2. Each of the hydrogen tanks 31, 32, 33 is configured of a high-strength part (the hydrogen tank is provided with, for example, an inner wall layer formed of metal, hard resin, or the like, and an outer wall layer formed by winding fiber reinforced plastic or the like several times) and has such high rigidity that the hydrogen tank is not easily deformed due to gas internal pressure or an external force at the time of a vehicle collision. In this embodiment, a hydrogen tank (not shown) is also disposed at the rear portion of the vehicle body (behind the transaxle 5).

The secondary battery 4 is disposed over the region between the intermediate portions 11a and the region between the rear-side kick portions 11d of the side rails 11 behind the hydrogen tank 3.

The secondary battery 4 is disposed such that the longitudinal direction thereof is along the vehicle width direction, and is provided with a plurality of brackets 41 extending along the horizontal direction, and the brackets 41 are superposed on and bolted to the intermediate portions 11a of the side rails 11 and the cross member 13e. The support structure for the secondary battery 4 is not limited thereto.

The distance dimension between a front end portion of the secondary battery 4 and a rear end portion of each of the hydrogen tanks 31, 32, 33 can be optionally set. However, it is desirable that the distance dimension is set to be larger than the amount of movement that is expected in a case where the hydrogen tanks 31, 32, 33 move toward the rear side of the vehicle body due to a vehicle front collision load at the time of the vehicle front collision.

The secondary battery 4 has a structure in which a plurality of well-known nickel-hydrogen secondary batterys is connected in series. The secondary battery 4 drives the traveling motor 51 at the time of start-up of the vehicle, recovers regenerative electric power at the time of decelerating regeneration, or is charged by receiving power supply from the fuel cell stack 2 according to a load, under the control of a central processing unit (CPU) (not shown). The secondary battery 4 may be any cell as long as it is a chargeable and dischargeable cell, and is not limited to a nickel-hydrogen secondary battery and may be, for example, a nickel-cadmium secondary battery, a lithium-hydrogen secondary battery, a lead storage battery, or the like. Alternatively, the secondary battery 4 may be a capacitor.

The transaxle 5 is disposed in the region between the rear-side kick portions 11d of the side rails 11 behind the secondary battery 4.

The transaxle 5 is provided with a plurality of brackets 50a extending in the horizontal direction toward the front side of the vehicle body or the rear side of the vehicle body, and the brackets 50a are superposed on and bolted to the cross members 13e, 13f. The support structure for the transaxle 5 is not limited thereto.

Figure 3:
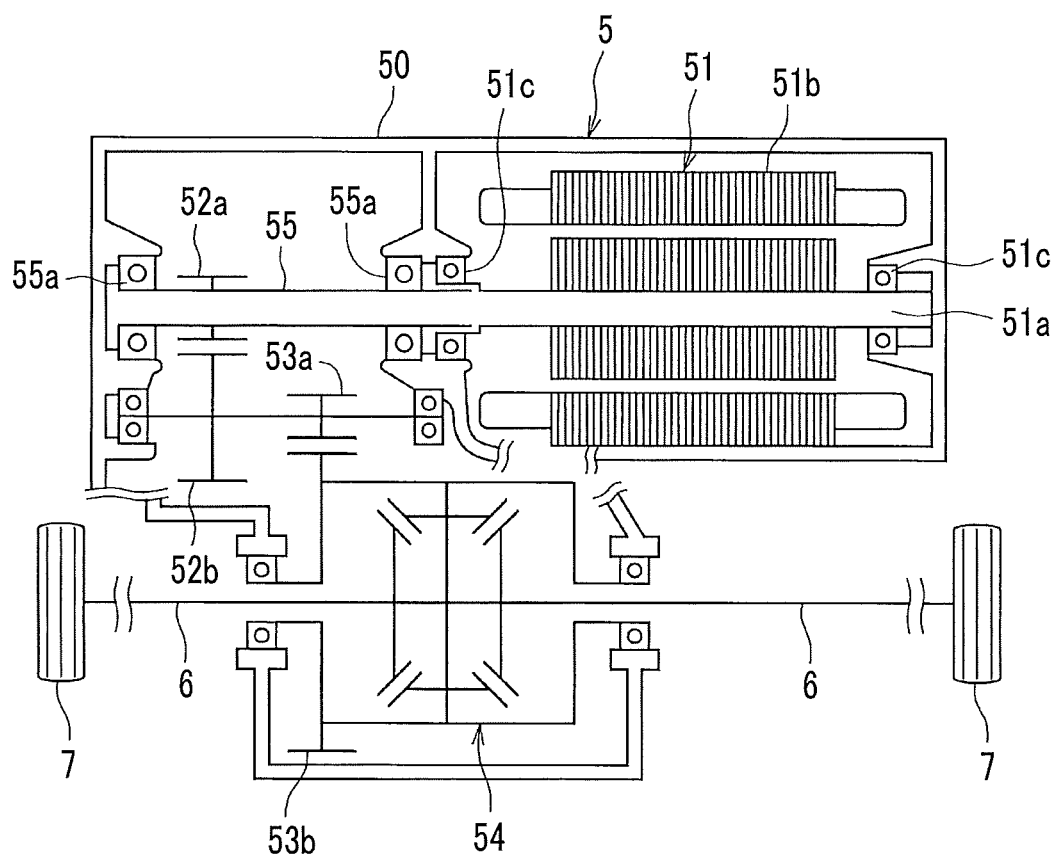
FIG. 3 is a schematic diagram showing an internal configuration of the transaxle.

FIG. 3 is a schematic diagram showing an internal configuration of the transaxle 5. The transaxle 5 has the traveling motor 51 as a traveling drive force source, a first reduction gear pair 52a, 52b, a second reduction gear pair 53a, 53b, and a differential device 54, and these are accommodated in a single case (transaxle case) 50 made of, for example, aluminum die-cast and are integrated. The brackets 50a are provided integrally with the transaxle case 50.

The transaxle 5 is disposed at the rear portion of the vehicle body so as to span a drive shaft 6 and is configured so as to pass a rotational drive force generated by the traveling motor 51 through the first reduction gear pair 52a, 52b, the second reduction gear pair 53a, 53b, and the differential device 54 and then transmit the rotational drive force to the rear wheels (driving wheels) 7 through the drive shaft 6.

The traveling motor 51 is a three-phase synchronous motor and has a rotor shaft 51a and a stator 51b fixed to the transaxle case 50 so as to surround the outer periphery of the rotor shaft 51a. The rotor shaft 51a is rotatably supported on the transaxle case 50 through a pair of bearings 51c mounted on both ends of the rotor shaft 51a. An output shaft 55 connected to the rotor shaft 51a is rotatably supported on the transaxle case 50 through a pair of bearings 55a mounted on both ends of the output shaft 55 and rotates integrally with the rotor shaft 51a. A direct current that is output from the fuel cell stack 2 or the secondary battery 4 passes through a distributor (not shown), and is then converted into a three-phase alternating current by the inverter to be supplied to the traveling motor 51. The traveling motor 51 receives such electric power to generate a rotational drive force, and the rotational drive force is transmitted to the rear wheels 7, thereby becoming the traveling drive force of the vehicle.

Basic Operation of Fuel Cell Vehicle

In the fuel cell vehicle configured as described above, hydrogen is supplied from the hydrogen tanks 31, 32, 33, whereby the fuel cell stack 2 generates electric power, and the traveling motor 51 is driven by the electric energy from the fuel cell stack 2. Then, the rotational drive force generated by the traveling motor 51 is transmitted to the differential device 54 through the first reduction gear pair 52a, 52b and the second reduction gear pair 53a, 53b and transmitted from the differential device 54 to the rear wheels 7 through the drive shaft 6. The traveling motor 51 is regeneratively driven according to a depression release operation (accelerator-off operation) of an accelerator pedal, or the like, whereby the generated electric power is recovered to the secondary battery 4, and thus the secondary battery 4 is charged.

Case of Vehicle Front Collision

Next, the case of the vehicle front collision will be described.

Figure 7:
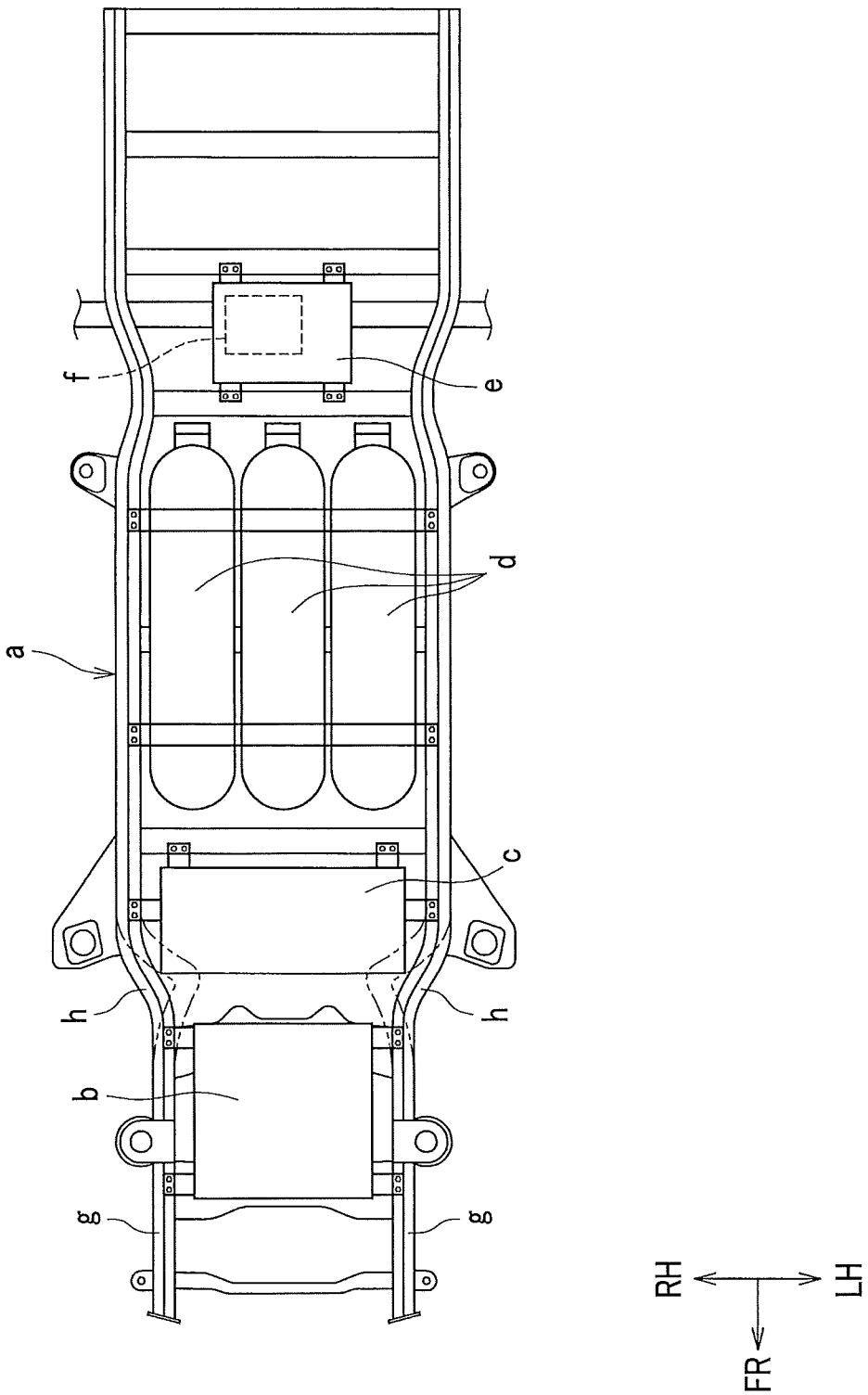
FIG. 7 is a plan view schematically showing a vehicle body frame in the related art and a configuration in which a fuel cell stack, a secondary battery, a hydrogen tank, and a transaxle are disposed in this order from the front side of a vehicle body on the vehicle body frame.

As described above, the front-side kick portions 11b of the side rails 11 have shapes that are curved outward in the vehicle width direction toward the rear side of the vehicle body. For this reason, in a case where a vehicle front collision load is input to the vehicle body frame 1 at the time of the vehicle front collision, the front-side kick portions 11b are buckled and deformed by receiving the vehicle front collision load and also move inward in the vehicle width direction while moving toward the rear side of the vehicle body (refer to an imaginary line in FIG. 1). That is, the front-side kick portion 11b is an example of a "deformed portion of the side rail". In a case where the front-side kick portions 11b move in this manner, when a secondary battery c is disposed in front of a hydrogen tank d, as shown in FIG. 7, when the amount of movement of each of kick portions h moving inward in the vehicle width direction has reached a predetermined amount, there is a possibility that the kick portions h may interfere with the secondary battery c (refer to an imaginary line in FIG. 7).

At the time of the vehicle front collision, the fuel cell stack 2 moves toward the rear side of the vehicle body due to the vehicle front collision load. That is, the fuel cell stack 2 is an example of a "moving member". In a case where the fuel cell stack 2 moves in this manner, when the secondary battery c is disposed in front of the hydrogen tank d, as shown in FIG. 7, when the amount of movement of a fuel cell stack b moving toward the rear side of the vehicle body has reached a predetermined amount, there is a possibility that the fuel cell stack b may interfere with the secondary battery c.

In contrast, in this embodiment, since the hydrogen tank 3 is disposed in front of the secondary battery 4, the front-side kick portions 11b that move as described above reach the hydrogen tank 3 without reaching the secondary battery 4 (refer to the imaginary line in FIG. 1), (in the other words, the front-side kick portions 11b that move as described above reach the hydrogen tank 3 without reaching the secondary battery 4) and the vehicle front collision load is input to the hydrogen tank 3 having higher rigidity than the secondary battery 4. For this reason, it is possible to restrain the vehicle front collision load from being input to the secondary battery 4, and thus it is possible to sufficiently protect the secondary battery 4 that is a high-voltage part.

The fuel cell stack 2 that moves as described above reaches the hydrogen tank 3 without reaching the secondary battery 4, and the vehicle front collision load is input to the hydrogen tank 3 having higher rigidity than the secondary battery 4. Even with this, it is possible to restrain the vehicle front collision load from being input to the secondary battery 4, and thus it is possible to sufficiently protect the secondary battery 4 that is a high-voltage part.

In this embodiment, the secondary battery 4 is disposed in front of the transaxle 5. For this reason, the secondary battery 4 having relatively large weight can be disposed at a position close to the center in the front-rear direction of the vehicle body, and thus equalization of the weight balance in the front-rear direction of the vehicle (equalization of the weight distribution in the front and rear of the vehicle body) can be achieved, thereby making it possible to contribute to improvement in steering stability of the vehicle.

Second Embodiment

Next, a second embodiment will be described. In the embodiment, the configurations of the side rails 11 of the vehicle body frame 1 and the mounting form of the hydrogen tank 3 are different from those in the first embodiment. Other configurations are the same as those in the first embodiment, and therefore, here, the configurations of the side rails 11 of the vehicle body frame 1 and the mounting form of the hydrogen tank 3 will be described mainly.

Figure 4:
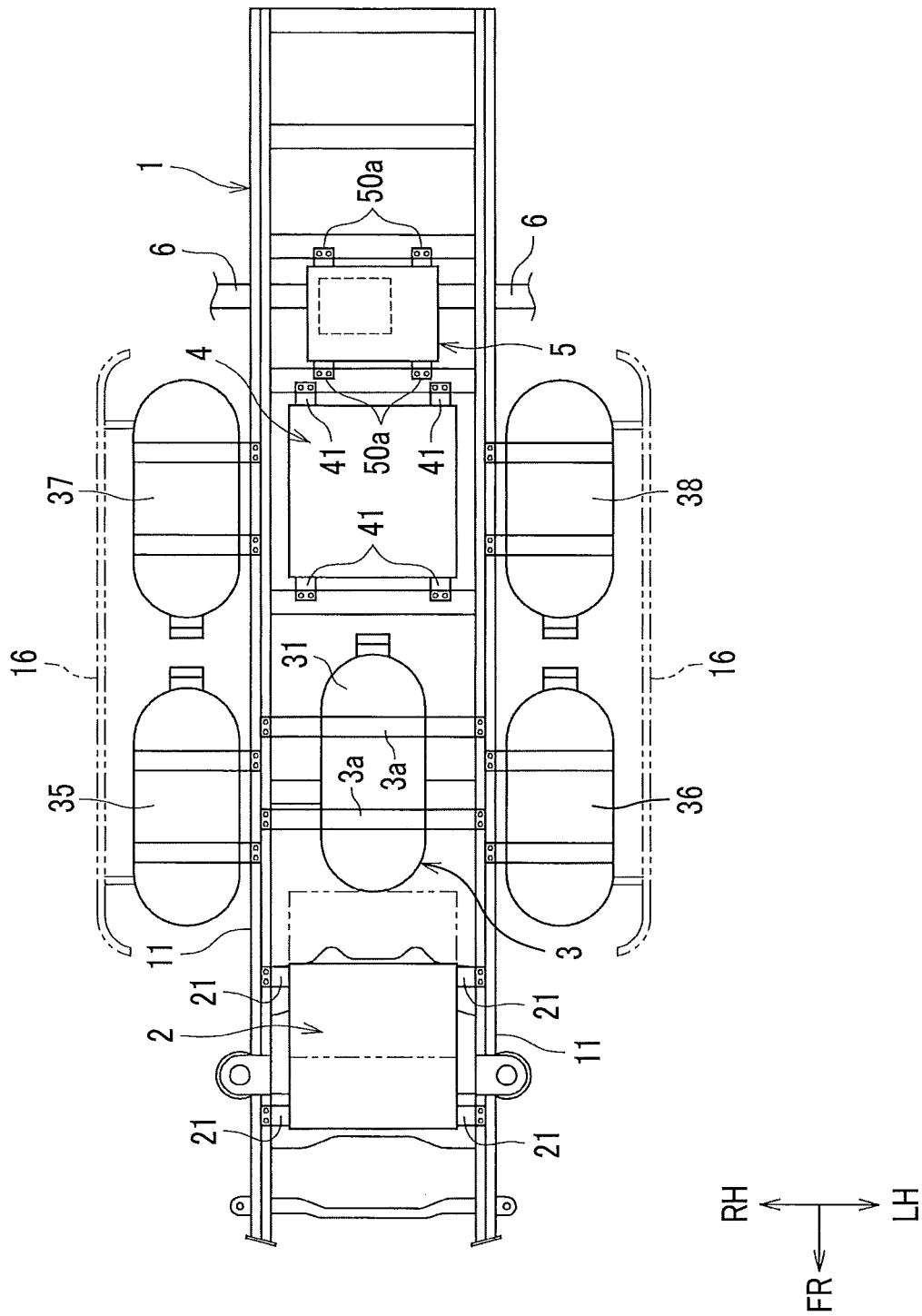
FIG. 4 is a diagram corresponding to FIG. 1 in a second embodiment.

FIG. 4 is a plan view schematically showing the vehicle body frame 1 according to this embodiment and the mounting form of each of the fuel cell stack 2, the hydrogen tank 3, the secondary battery 4, and the transaxle 5 disposed on the vehicle body frame 1. In FIG. 4, the same members as the members in FIG. 1 used in the first embodiment are denoted by the same reference numerals.

The vehicle body frame 1 in this embodiment is not provided with the front-side kick portions and the rear-side kick portions as described above, and the side rails 11 are formed in a straight line shape (straight type) in the front-rear direction of the vehicle body.

Also in this embodiment, similar to the first embodiment, the fuel cell stack 2, the hydrogen tank 31, the secondary battery 4, and the transaxle 5 are disposed in this order from the front side of the vehicle body in the region between the side rails 11.

For this reason, also in this embodiment, similar to the case of the first embodiment, when the fuel cell stack 2 moves toward the rear side of the vehicle body due to the vehicle front collision load, in a case where the amount of movement of the fuel cell stack 2 has reached a predetermined amount, the fuel cell stack 2 reaches the hydrogen tank 31 without reaching the secondary battery 4 (refer to an imaginary line in FIG. 4), and the vehicle front collision load is input to the hydrogen tank 31 having higher rigidity than the secondary battery 4. That is, it is possible to restrain the vehicle front collision load from being input to the secondary battery 4, and thus it is possible to sufficiently protect the secondary battery 4 that is a high-voltage part.

In this embodiment, hydrogen tanks 35 to 38 are also disposed outside the side rails 11 in the vehicle width direction. Specifically, the hydrogen tanks 35, 36 are disposed on a side of the hydrogen tank 31, the side being both outer sides of the side rails 11 with respect to the hydrogen tank 31 disposed in the region between the side rails 11. The hydrogen tanks 37, 38 are disposed on a side of the secondary battery 4, the side being both outer sides of the side rails 11 with respect to the secondary battery 4 disposed in the region between the side rails 11. The hydrogen tanks 35 to 38 are supported on the side rails 11.

With such a configuration, in a case where a vehicle side collision load is input from the right side of the vehicle body at the time of a vehicle side collision, the vehicle side collision load is input to the hydrogen tanks 35, 37 and the side rail 11, and thus it is possible to restrain the vehicle side collision load from being input to the secondary battery 4. In a case where a vehicle side collision load is input from the left side of the vehicle body, the vehicle side collision load is input to the hydrogen tanks 36, 38 and the side rail 11, and also in this case, it is possible to restrain the vehicle side collision load from being input to the secondary battery 4. For this reason, it is also possible to sufficiently protect the secondary battery 4 that is a high-voltage part, against the vehicle side collision load. Side covers 16 for protecting the hydrogen tanks 35 to 38 are disposed outside the hydrogen tanks 35 to 38.

Figure 5:
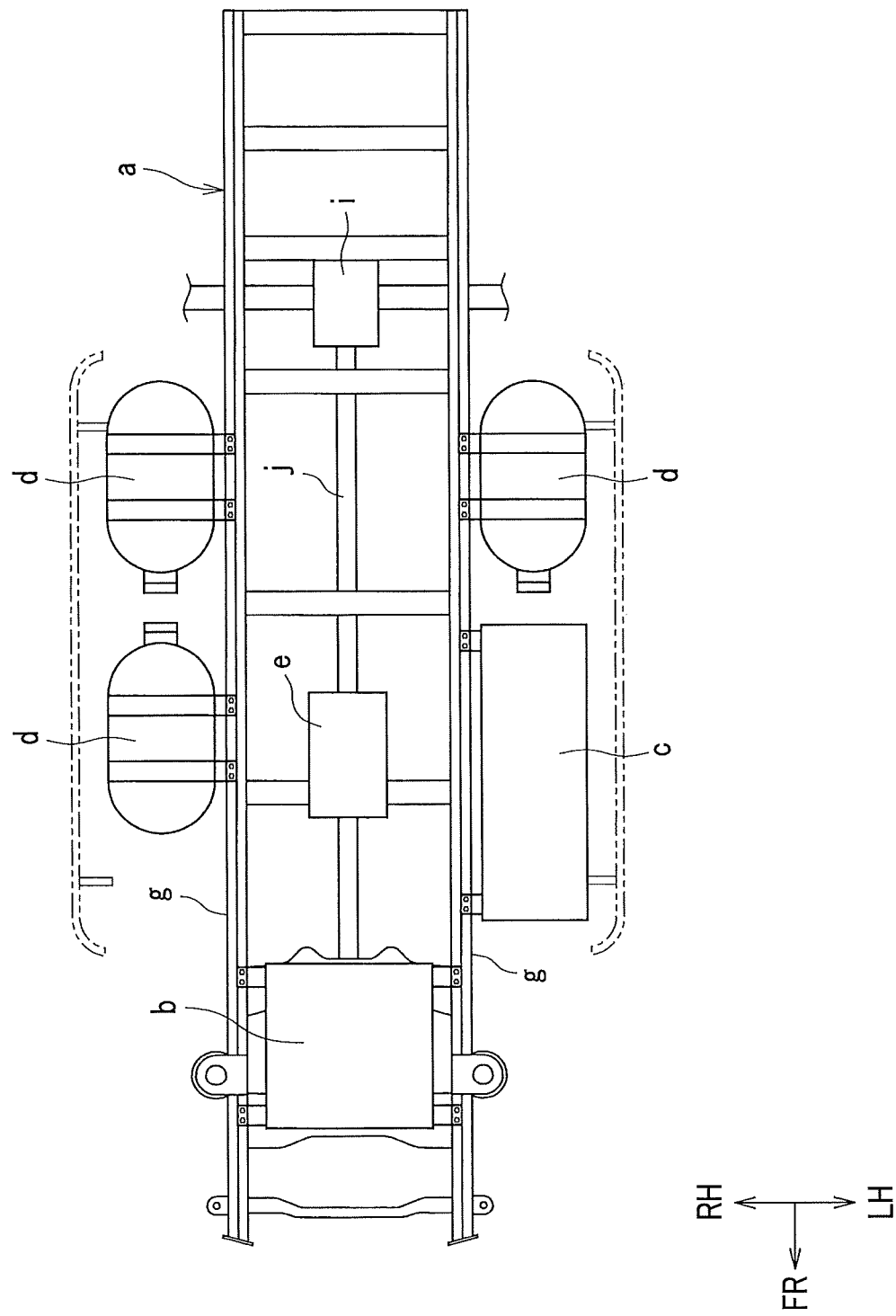
FIG. 5 is a diagram showing a comparative example in the related art and is a plan view schematically showing a vehicle body frame provided with a straight type side rail and a configuration in which a secondary battery is disposed outside the vehicle body frame in a vehicle width direction.

FIG. 5 is a plan view schematically showing, as a comparative example, a vehicle body frame a provided with straight type side rails g formed in a straight line shape in the front-rear direction of the vehicle body and a configuration in which a secondary battery c is disposed outside the vehicle body frame a in the vehicle width direction. In FIG. 5, a configuration is shown in which a transaxle e is disposed behind a fuel cell stack b and a propeller shaft j extending along the front-rear direction of the vehicle body is disposed between the transaxle e and a differential device i.

In this manner, in a case where the propeller shaft j is disposed in the region between the side rails g, it is not possible to dispose a hydrogen tank d or the secondary battery c in this region. For this reason, it is needed to dispose the secondary battery c outside the side rail g (on the left side in the vehicle width direction in FIG. 5), and thus there is a possibility that a vehicle side collision load may be input to the secondary battery c at the time of a vehicle side collision, and therefore, it is difficult to sufficiently protect the secondary battery c.

In this embodiment, as described above, since the secondary battery 4 is disposed in the region between the side rails 11 and the hydrogen tanks 37, 38 are disposed on a side of the secondary battery 4, the side being both outer sides of the side rails 11 with respect to the secondary battery 4, it is also possible to sufficiently protect the secondary battery 4 against the vehicle side collision load.

Third Embodiment

Next, a third embodiment will be described. In this embodiment, similar to the first embodiment, the disclosure is applied to the fuel cell vehicle provided with the vehicle body frame 1 having the front-side kick portions 11b at the side rails 11. In this embodiment, the mounting forms of the hydrogen tank 3 and the secondary battery 4 are different from those in the first embodiment. For this reason, here, the mounting forms of the hydrogen tank 3 and the secondary battery 4 will be described mainly.

Figure 6:
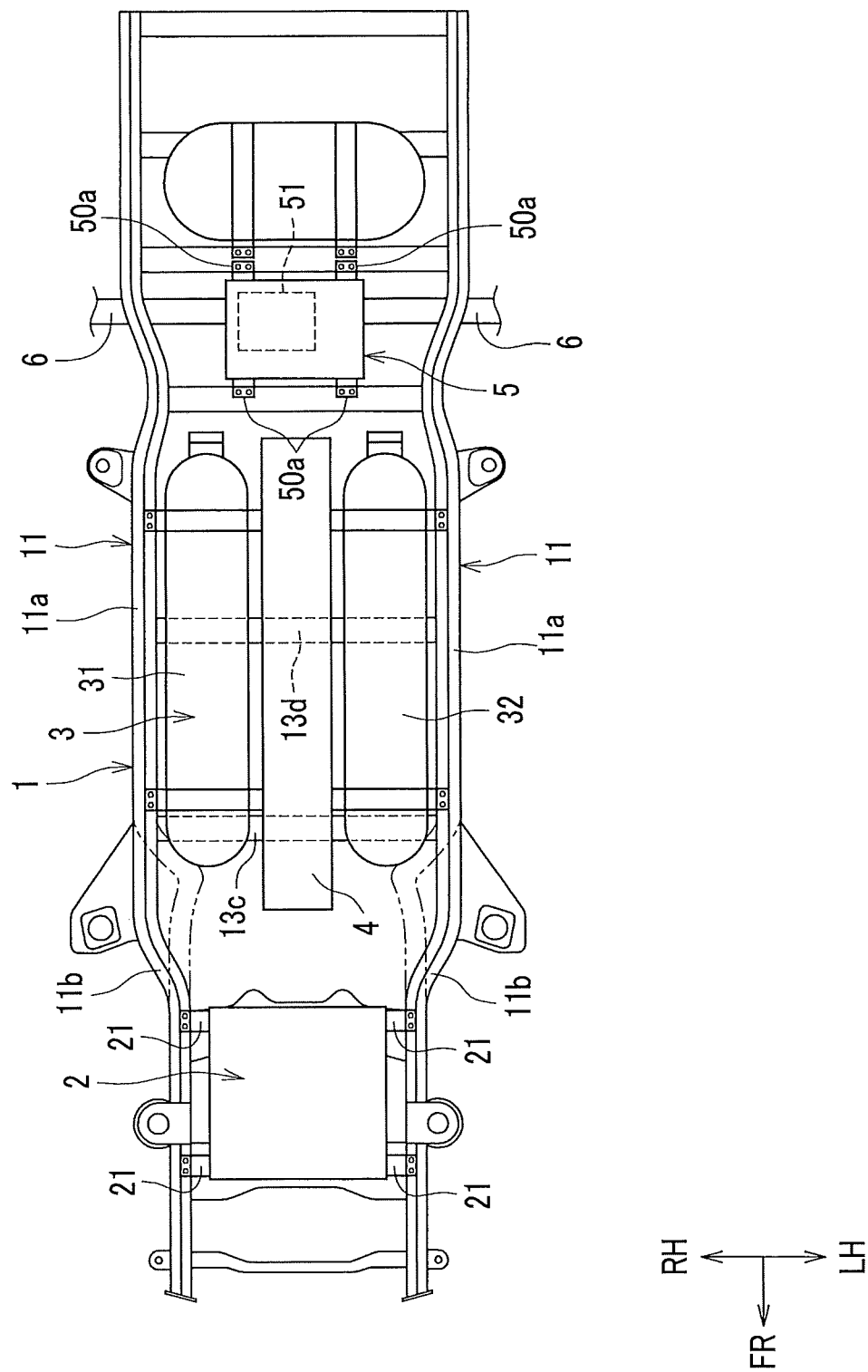
FIG. 6 is a diagram corresponding to FIG. 1 in a third embodiment.

FIG. 6 is a plan view schematically showing the vehicle body frame 1 according to this embodiment and the mounting form of each of the fuel cell stack 2, the hydrogen tank 3, the secondary battery 4, and the transaxle 5 disposed on the vehicle body frame 1. Also in FIG. 6, the same members as the members in FIG. 1 used in the first embodiment are denoted by the same reference numerals.

As shown in FIG. 6, the hydrogen tank 3 is disposed in the region between the intermediate portions 11a of the side rails 11, behind the fuel cell stack 2. In the hydrogen tank 3 in this embodiment, the two hydrogen tanks 31, 32 are longitudinally placed (disposed such that the longitudinal direction thereof is along the front-rear direction of the vehicle body) at a predetermined interval in the vehicle width direction. That is, the hydrogen tank 31 that is located on the right side in the vehicle width direction is disposed close to the side rail 11 located on the right side in the vehicle width direction and so as to follow the intermediate portion 11a of the side rail 11. The hydrogen tank 32 that is located on the left side in the vehicle width direction is disposed close to the side rail 11 located on the left side in the vehicle width direction and so as to follow the intermediate portion 11a of the side rail 11. Also in this embodiment, each of the hydrogen tanks 31, 32 is placed in a state of being spanned between the cross members 13c, 13d and is mounted to each of the side rails 11 by the bands 3a. The mounting structure of the hydrogen tanks 31, 32 using the bands 3a is well known, and a configuration is made in which both ends of each of the bands 3a wound around the outer periphery of each of the hydrogen tanks 31, 32 are fastened to each of the side rails 11. A configuration is also acceptable in which both ends of each of the bands 3a are fastened to each of the cross members 13c, 13d.

The secondary battery 4 is disposed between the hydrogen tanks 31, 32. That is, the secondary battery 4 is disposed in a space between the hydrogen tanks 31, 32 is for disposing.

The secondary battery 4 in this embodiment has a rectangular shape when viewed in a plan view, and is disposed such that the longitudinal direction thereof is along the front-rear direction of the vehicle body. The front end of the secondary battery 4 is located at a position slightly further protruding toward the front side of the vehicle body than the front end positions of the hydrogen tanks 31, 32. The front end position of the secondary battery 4 is set in advance by experiment and simulation such that in a case where the front-side kick portions 11b move inward in the vehicle width direction while moving toward the rear side of the vehicle body by receiving the vehicle front collision load, the moving front-side kick portions 11b reach the hydrogen tanks 31, 32 without reaching the secondary battery 4.

The secondary battery 4 is provided with a plurality of brackets (not shown) extending in the horizontal direction, and the brackets are superposed on and bolted to the cross members 13c, 13d. The support structure for the secondary battery 4 is not limited thereto.

The case of the vehicle front collision in this embodiment will be described. As described above, the front-side kick portions 11b of the side rails 11 have shapes that are curved outward in the vehicle width direction toward the rear side of the vehicle body. For this reason, in a case where the vehicle front collision load is input to the vehicle body frame 1 at the time of the vehicle front collision, the front-side kick portions 11b are buckled and deformed by receiving the vehicle front collision load and also move inward in the vehicle width direction while moving toward the rear side of the vehicle body (refer to an imaginary line in FIG. 6). In a case where the front-side kick portions 11b move in this manner, in this embodiment, since the hydrogen tanks 31, 32 are disposed on both outer sides of the secondary battery 4 in the vehicle width direction, when the amount of movement of each of the front-side kick portions 11b has reached a predetermined amount, the front-side kick portions 11b reach the hydrogen tanks 31, 32 without reaching the secondary battery 4, and the vehicle front collision load is input to the hydrogen tanks 31, 32 having higher rigidity than the secondary battery 4. For this reason, it is possible to restrain the vehicle front collision load from being input to the secondary battery 4, and thus it is possible to sufficiently protect the secondary battery 4 that is a high-voltage part.

In this embodiment, the secondary battery 4 is disposed at a central portion in the front-rear direction of the vehicle body in the fuel cell vehicle (in this specification, the "central portion" is a meaning including a "substantially central portion"). That is, the secondary battery 4 having relatively large weight is disposed at the central portion in the front-rear direction of the vehicle body, and thus equalization of the weight balance in the front-rear direction of the vehicle (equalization of the weight distribution in the front and rear of the vehicle body) can be achieved, thereby making it possible to contribute to improvement in steering stability of the vehicle.

Other Embodiments

The disclosure is not limited to the embodiments described above, and all modifications or applications that are included within the scope of the claims and the scope equivalent to the claims are possible.

For example, in each of the embodiments described above, a configuration is adopted in which the fuel cell stack 2 is disposed at the front portion of the vehicle body and the transaxle 5 is disposed at the rear portion of the vehicle body. That is, the disclosure is applied to a rear-wheel drive type fuel cell vehicle in which a traveling drive force source is disposed in the front portion of the vehicle body. The disclosure is not limited thereto and can also be applied to a configuration in which a fuel cell stack is disposed at the rear portion of the vehicle body and a transaxle is disposed at the front portion of the vehicle body, that is, a front-wheel drive type fuel cell vehicle in which a traveling drive force source is disposed at the rear portion of the vehicle body. In this case, the moving member (the moving member that moves toward the rear side of the vehicle body due to the vehicle front collision load) referred to in the disclosure is the transaxle.

In each of the embodiments described above, the transaxle 5 and the driving wheels 7 are directly connected. The disclosure is not limited thereto and can also be applied to a structure in which the transaxle 5 and the driving wheels 7 are connected through a constant velocity joint (CVJ).

The configuration in which the hydrogen tanks 37, 38 are disposed on a side of the secondary battery 4, the side being outside of the side rails 11 in the vehicle width direction, as in the second embodiment, can also be applied to the first embodiment or the third embodiment. In a case where the hydrogen tanks 37, 38 are disposed on the side of the secondary battery 4 in this manner, the disposition positions of the hydrogen tanks 37, 38 may be located inside the side rails 11 in the vehicle width direction.

The disclosure is applicable to a fuel cell vehicle provided with a vehicle body having a frame structure.

What is claimed is:

1. A vehicle comprising:
a vehicle body having a frame structure provided with a pair of right and left side rails; and
hydrogen tanks and a secondary battery disposed in a region between the side rails, wherein:
the side rails have deformed portions that are deformed due to a vehicle front collision load at a time of a vehicle front collision; and
the hydrogen tanks are disposed such that outer sides of the hydrogen tanks are outside outer sides of the secondary battery in a vehicle width direction such that the deformed portions, when an amount of movement of each of the deformed portions of the side rails has reached a predetermined amount, reach the hydrogen tanks without reaching the secondary battery.

2. The vehicle according to claim 1, wherein the deformed portion of each of the side rails is a first kick portion that is curved outward in the vehicle width direction toward a rear side of the vehicle body in front of the hydrogen tanks.

3. The vehicle according to claim 2, wherein front ends of the hydrogen tanks are disposed rearward of the first kick portion in a vehicle front-rear direction.

4. The vehicle according to claim 1, wherein:
a transaxle having a running motor is disposed between a pair of right and left rear wheels as driving wheels;
a drive shaft extending along the vehicle width direction from the transaxle is connected to each of the rear wheels; and
the secondary battery is disposed in front of the transaxle in a vehicle front-rear direction.

5. The vehicle according to claim 1, further comprising hydrogen tanks disposed on a side of the secondary battery, the side being outside of the side rails in the vehicle width direction.

6. The vehicle according to claim 1, wherein the hydrogen tanks are disposed between the side rails in the vehicle width direction.

7. A vehicle comprising:
a vehicle body having a frame structure provided with a pair of right and left side rails;
hydrogen tanks and a secondary battery disposed in a region between the side rails; and
a moving member that moves toward a rear side of the vehicle body due to a vehicle front collision load at a time of a vehicle front collision,
wherein the hydrogen tanks are is disposed such that outer sides of the hydrogen tanks are outside outer sides of the secondary battery in a vehicle width direction such that the moving member, when an amount of movement of the moving member has reached a predetermined amount, reaches the hydrogen tanks without reaching the secondary battery.

8. The vehicle according to claim 7, wherein the moving member is a fuel cell stack disposed in front of the hydrogen tanks in a vehicle front-rear direction.

9. The vehicle according to claim 7, wherein:
a transaxle having a running motor is disposed between a pair of right and left rear wheels as driving wheels;
a drive shaft extending along a vehicle width direction from the transaxle is connected to each of the rear wheels; and
the secondary battery is disposed in front of the transaxle in a vehicle front-rear direction.

10. The vehicle according to claim 7, further comprising hydrogen tanks disposed on a side of the secondary battery, the side being outside of the side rails in the vehicle width direction.

11. The vehicle according to claim 7, wherein the hydrogen tanks are disposed between the side rails in the vehicle width direction.

12. A vehicle comprising:
a vehicle body having a frame structure provided with a pair of right and left side rails; and
hydrogen tanks and a secondary battery disposed in a region between the side rails, wherein:
the side rails have deformed portions that are deformed due to a vehicle front collision load at a time of a vehicle front collision; and
the hydrogen tanks are disposed in front of the secondary battery or on both outer sides of the secondary battery in a vehicle width direction such that a distance between the deformed portion of each of the side rails and the secondary battery is shorter than a distance between the deformed portion of each of side rails and each of the hydrogen tanks.

13. A vehicle comprising:
a vehicle body having a frame structure provided with a pair of right and left side rails; and
hydrogen tanks and a secondary battery disposed in a region between the side rails, wherein:
the side rails have deformed portions that are deformed due to a vehicle collision load at a time of a vehicle collision; and
the hydrogen tanks are disposed in front of the secondary battery or on both outer sides of the secondary battery in a vehicle width direction such that a distance between the deformed portion of each of the side rails and the secondary battery is shorter than a distance between the deformed portion of each of side rails and each of the hydrogen tanks.

* * * * *